United States Patent [19]

Rukavina et al.

[11] Patent Number: 5,776,548

[45] Date of Patent: Jul. 7, 1998

[54] PRIMER FOR PROMOTING ADHESION OF POLYURETHANE TO A METAL OXIDE COATING

[75] Inventors: Thomas G. Rukavina, Verona; Robert M. Hunia, Kittanning, both of Pa.

[73] Assignee: PPG Industries, Inc., Pittsburgh, Pa.

[21] Appl. No.: 743,874

[22] Filed: Nov. 5, 1996

[51] Int. Cl.⁶ .................. B05D 1/38; B05D 3/02; B05D 1/02; B05D 1/18

[52] U.S. Cl. .................. 427/407.1; 427/380; 427/419.2; 427/420; 427/421; 427/430.1

[58] Field of Search .................. 427/407.1, 419.2, 427/419.5, 162, 430.1, 421, 420, 380

[56] References Cited

U.S. PATENT DOCUMENTS

| | | | |
|---|---|---|---|
| 4,094,763 | 6/1978 | Gillery et al. | 204/192 P |
| 4,113,599 | 9/1978 | Gillery | 204/192 P |
| 4,198,468 | 4/1980 | Molari | 428/412 |
| 4,335,187 | 6/1982 | Rukavina et al. | 428/412 |
| 4,414,254 | 11/1983 | Iwata et al. | 428/34 |
| 4,434,284 | 2/1984 | Rukavina et al. | 528/58 |
| 4,435,450 | 3/1984 | Coleman | 427/385.5 |
| 4,554,318 | 11/1985 | Rukavina | 525/118 |
| 4,609,703 | 9/1986 | Rukavina | 524/360 |
| 4,610,771 | 9/1986 | Gillery | 204/192.1 |
| 4,622,120 | 11/1986 | Gillery | 204/192.26 |
| 4,670,350 | 6/1987 | Rukavina | 428/520 |
| 4,710,426 | 12/1987 | Stephens | 428/336 |
| 4,725,501 | 2/1988 | Rukavina et al. | 428/412 |
| 4,731,289 | 3/1988 | Coleman | 428/334 |
| 4,857,407 | 8/1989 | Coleman et al. | 428/412 |
| 4,904,526 | 2/1990 | Koskenmaki | 428/328 |
| 5,178,966 | 1/1993 | Gillery | 428/623 |
| 5,471,554 | 11/1995 | Rukavina et al. | 385/131 |
| 5,505,808 | 4/1996 | Hallman et al. | 156/233 |
| 5,506,037 | 4/1996 | Temath | 428/216 |

OTHER PUBLICATIONS

Anonymous, "Research Disclosure", *Low Molecular (Meth)Acrylic Copolymers*, Jun. 1995, p. 366.

Union Carbide "Cycloaliphatic Epoxide Systems" informational brochure bearing copyright dates 1970, 1976, 1978, 1987, 1989 (28 pages) (no month).

*Primary Examiner*—Diana Dudash
*Attorney, Agent, or Firm*—Raymond J. Harmuth

[57] ABSTRACT

The present invention relates to a primer for adhering a polyurethane to a metal oxide coating, to a method of making such a primer, and to a method of adhering a polyurethane protective liner to a metal oxide coating. The primer is a reaction product of a crosslinking agent and a polymer selected from the group consisting of a copolymer of 2-ethylhexylacrylate and acrylic acid, a copolymer of cyanoethylacrylate and acrylic acid and a terpolymer of cyanoethylacrylate, 2-ethylhexylacrylate and acrylic acid.

40 Claims, 1 Drawing Sheet

PRIMER FOR PROMOTING ADHESION OF POLYURETHANE TO A METAL OXIDE COATING

CROSS REFERENCE TO RELATED APPLICATIONS

U.S. patent application Ser. No. 08/743,867, pending, filed even date in the name of Thomas G. Rukavina and Robert M. Hunia for "Improved Aircraft Transparency" and U.S. patent application Ser. No. 08/743,875, pending, filed even date in the name of Thomas G. Rukavina and Robert M. Hunia for "Primer for Promoting Adhesion of Electroconductive Metal Oxide Coating to Plastic Substrates" are related to the instant application.

BACKGROUND

1. Field of the Invention

The present invention relates to a primer for adhering a polyurethane to a metal oxide coating, to a method of making such a primer, and to a method of adhering a polyurethane protective liner to a metal oxide coating.

2. Description of the Related Art

Metal oxide coatings are widely used for a variety of purposes. For example, in the formation of aircraft transparencies metal oxide coatings have been used to melt ice and remove moisture from the aircraft transparency where conductive coatings of metal oxides, including tin oxide or indium tin oxide are embedded in interlayers of the aircraft transparency and are energized with electric current. In addition to melting ice and removing moisture, the metal oxide coatings can be used to absorb microwave energy for the protection of the aircraft occupants and/or as an antistatic coating to remove static electricity that may build up on the aircraft during flight. Metal oxide coatings are also used for magnetic recording tapes or to provide infrared absorbing films on glass, to name but a few of the many uses for metal oxide coatings.

For many of the uses of metal oxide coatings, it is desirable to protect the metal oxide coatings from physical abrasion, moisture, exposure to the environment, chemical attack or any number of other deleterious effects. Coating the metal oxide coating with a polyurethane protective layer, also known as a polyurethane protective liner could provide the desired protection if it could be made to adhere to the metal oxide coating.

In fact, efforts have been made in the art to adhere various materials to metal oxide coatings.

U.S. Pat. Nos. 4,554,318; 4,609,703 and 4,670,350 to Rukavina disclose copolymers of acrylic acid and cyanoethylacrylate for bonding indium oxide films to acrylic substrates. Also disclosed is a terpolymer of cyanoethylacrylate, acrylic acid and hydroxyethylacrylate for the same purpose.

U.S. Pat. No. 4,725,501 to Rukavina discloses a silicate/titanate copolymer for use as a primer to adhere a vinyl interlayer to stretched acrylic or indium/tin oxide coated stretched acrylic substrate.

Other combinations of metal oxides and methods for applying them to a substrate are described in U.S. Pat. Nos. 4,094,763; 4,113,599; 4,434,284; 4,610,771; 4,622,120; 4,904,526 and 5,178,966.

However, limitations remain in the art. Separation of the polyurethane protective liner from the metal oxide coating occurs due primarily to the poor adhesion between the two, and the stress of unequal expansion and contraction of the metal oxide coating with respect to the polyurethane protective liner. Even minor separation can result in rejection of an article so formed, depending upon its intended use.

As can be appreciated from the foregoing, it would be advantageous to provide a polyurethane protective liner strongly adhered over an electroconductive metal oxide coating which reduces or eliminates any separation between the metal oxide coating and the polyurethane protective liner.

SUMMARY OF THE INVENTION

The present invention relates to a primer (hereinafter referred to as a "polyurethane primer") for adhering a polyurethane protective liner over a metal oxide coating, to a method of making such a polyurethane primer, and to a method of adhering a polyurethane protective liner to a metal oxide coating.

In one embodiment, the polyurethane primer of the instant invention is a crosslinked copolymer of acrylic acid (hereinafter "AA") and substituted acrylates such as 2-ethylhexylacrylate (hereinafter "EHA"). In an alternative embodiment of the present invention the primer is a crosslinked copolymer of cyanoethylacrylate (hereinafter "CEA") and AA. In still another embodiment of the present invention, the primer is a crosslinked terpolymer of CEA/EHA/AA.

The polyurethane primer of the present invention exhibits, among other things, improved bonding of the polyurethane protective liner to the metal oxide coating and provides a shear absorbing layer which reduces shear stress on the electroconductive metal oxide coating caused by the differing coefficients of expansion between the metal oxide coating and the polyurethane protective liner.

DESCRIPTION OF THE DRAWING

The FIGURE is a side elevational view of a cross section of a substrate showing the polyurethane primer of the present invention adhering the metal oxide coating to the polyurethane protective liner.

DESCRIPTION OF THE PREFERRED EMBODIMENTS

Figure 1:
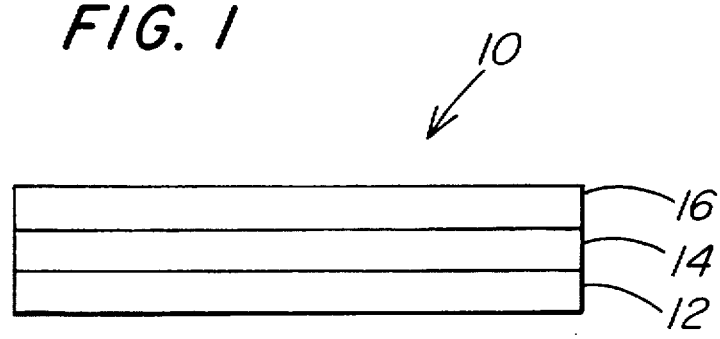

As will be appreciated, the articles within the scope of the present invention are not limited to the configuration comprising a metal oxide coating/polyurethane primer/polyurethane protective liner, but may further include substrates, interlayers, other liners, primers, coatings and the like, where strong adhesion of the polyurethane protective liner to the metal oxide coating is a desired component of the article.

Referring now to the figure, there is shown a cross section of a laminate 10 showing the polyurethane primer 14 of the instant invention interposed between and adhering together a metal oxide coating 12 and a polyurethane protective liner 16.

I. THE POLYURETHANE PRIMER

The polyurethane primer of the instant invention adheres together the electroconductive metal oxide coating and the polyurethane protective liner by interposing the primer between the metal oxide coating and the polyurethane protective liner.

In one embodiment, the polyurethane primer of the instant invention is a crosslinked copolymer of acrylic acid (hereinafter "AA") and substituted acrylates such as 2-ethylhexylacrylate (hereinafter "EHA"). In an alternative embodiment of the present invention the primer is a crosslinked copolymer of cyanoethylacrylate (hereinafter "CEA") and AA. In still another embodiment of the present invention, the primer is a terpolymer of CEA/EHA/AA.

These copolymers and terpolymer are prepared by polymerizing the respective monomers in an appropriate solvent using a free radical initiator. It is a three step process in which the copolymer or terpolymer is formed in a first step, followed by formation of an uncrosslinked polyurethane primer composition in a second step, followed by a third step of applying the primer composition over the metal oxide coating and curing of the primer composition to cause the primer composition to crosslink, thereby forming the polyurethane primer of the instant invention on the metal oxide coating. The polyurethane primer is then overcoated with the polyurethane protective liner. The polyurethane primer has good adhesion to the metal oxide coating and to the polyurethane protective liner.

I.A. MONOMERS AND RATIOS

Where the polyurethane primer is an EHA/AA copolymer, the mole ratio of EHA to AA in the polyurethane primer of the present invention may vary from 3:1 to 1:3. Where the polyurethane primer is a CEA/AA copolymer, the mole ratio may vary from 3:1 to 1:3. Where the polyurethane primer is a CEA/EHA/AA terpolymer, the mole ratio may vary from 1:2:1 to 0.5:0.5:3.

Increasing the mole ratio of AA beyond the specified mole ratio increases the solvent resistance of the polyurethane primer, but at the expense of raising the glass transition temperature of the primer. Increasing the mole ratio of CEA beyond the specified mole ratio increases the water absorption and reduces the humidity resistance. Increasing the mole ratio of EHA beyond the specified ratio lowers the glass transition temperature but simultaneously lowers the polyurethane primer's ability to withstand exposure to solvents that may be present in the polyurethane protective liner as the polyurethane protective liner is applied in liquid form over the polyurethane primer.

It is preferred that the polyurethane primer exhibit as low a glass transition temperature and as high a solvent resistance as possible. This is so because it is preferred to cure the polyurethane primer composition at a temperature above the glass transition temperature of the polyurethane primer itself, (to reduce thermally induced stresses and to obtain a complete cure of the polyurethane primer composition) and yet remain below a temperature that would cause thermal stress in the metal oxide coating. Where the polyurethane primer has a glass transition temperature after crosslinking of less than 180° F. (82.2°C.), the polyurethane primer composition can be fully cured but without developing thermally induced stresses in the metal oxide coating, (particularly an indium/tin metal oxide coating), which could occur with a glass transition temperature above 180° F. (82.2° C.).

For a metal oxide coating comprising indium/tin oxide having a 10 ohm/square resistance, over which a polyurethane primer having the preferred EHA/AA copolymer is deposited, the optimum ratio of EHA to AA in the copolymer is 2:1. This ratio will provide a desirably low starting glass transition temperature in the EHA/AA copolymer prior to crosslinking of about −30° F. (−34° C.) which results in a desirable glass transition temperature after crosslinking of about 131° F. (55° C.), well below the 180° F. (82.2° C.) threshold discussed above. The EHA/AA copolymer has a desirable crosslinking density which resists solvent degradation by solvents of the polyurethane protective liner. (The starting glass transition temperature of the polyurethane primer composition prior to crosslinking directly affects the final glass transition temperature of the polyurethane primer after crosslinking.) This ratio of 2:1 of EHA to AA is also preferred because it provides a sufficient number of hydroxyl groups in the polyurethane primer after reaction of the AA with a crosslinker as discussed below, which hydroxyl groups are necessary for adhesion of the polyurethane primer to the metal oxide coating.

The molecular weight range of the EHA/AA copolymer, CEA/AA copolymer or CEA/EHA/AA terpolymer of the present invention prior to crosslinking is about 10,000 to 100,000, preferably 25,000 to 50,000 grams per mole.

I.B. SOLVENT

More particularly, the copolymers or terpolymer of the instant invention are formed in a first step by adding the respective monomers to an appropriate solvent, such as 1-methoxy-2-propanol where the monomers comprise 10 to 80 wt %, preferably 40 to 60 wt % of the monomer/solvent solution. The monomer/solvent solution is stirred until thoroughly blended. The solution is sparged with dry nitrogen for about 20 minutes to displace any oxygen in the solution which oxygen would terminate free radical polymerization.

I.C. FREE RADICAL INITIATOR

Next, a free radical initiator is added and mixed at about room temperature until dissolved. Appropriate free radical initiators include azobisisobutyronitrile (hereinafter "AIBN"). Weight percents of initiator can be varied from 0.01 wt % to 2.0 wt % but are preferably about 0.10 to 1.0 wt % by weight of the monomers present in the monomer/solvent solution.

I.D. FORMATION OF COPOLYMER OR TERPOLYMER

Upon addition of the free radical initiator, polymerization of the monomers commences when the temperature of the solution is raised to about 147.2° F. (64° C.). Stirring is continued during the polymerization process. Total reaction time is generally about 12 hours to obtain high conversion of monomers to the respective copolymers or terpolymer. Percent conversion preferably ranges from about 94 to 99%. A nitrogen blanket is kept over the solution throughout the polymerization to prevent oxygen inhibition of the free radical polymerization.

At the end of the polymerization process, the resulting product is a clear viscous liquid with a slight amber cast.

I.E. FORMATION OF POLYURETHANE PRIMER COMPOSITION

In a second step, at least a portion of the copolymer or terpolymer formed in the first step is blended with additional components to form a polyurethane primer composition. More particularly, the copolymer or terpolymer described above is blended with a crosslinker, an optional catalyst, an optional surfactant, and an optional additional higher boiling solvent to form a polyurethane primer composition. The polyurethane primer composition has a solids content of about 10% to 50%, preferably 20% to 40% solids by weight of polyurethane primer composition. The individual components of the primer composition are discussed as follows.

I.E.1. CROSSLINKING AGENT

The crosslinking agent of the polyurethane primer composition includes cycloaliphatic compounds, including cycloaliphatic diepoxides, and still further including compounds of the general formula:

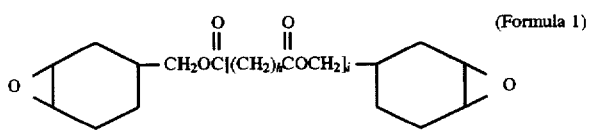

(Formula 1)

where h is an integer from 0 or 1 and i is an integer from 2 to 6.

Two particular cycloaliphatic diepoxides useful with the present invention are available under the trade names are ERL-4221 and ERL-4299 from Union Carbon of Danbury, Conn.

ERL-4221 is 3,4-epoxycyclohexylmethyl-3,4-epoxy-cyclohexanecarboxylate whose chemical formula is shown below:

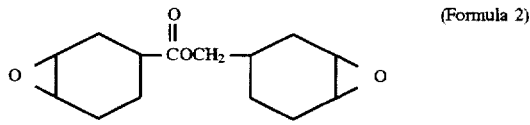

(Formula 2)

ERL-4229 is bis(3,4-epoxycyclohexyl)adipate, whose chemical formula is shown below:

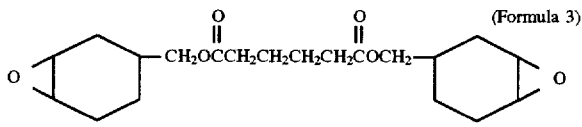

(Formula 3)

The appropriate amount of crosslinker to be added to the polyurethane primer composition is conveniently calculated in terms of the epoxy group equivalents in the crosslinker versus carboxylic acid group equivalents in the copolymer or terpolymer. The epoxy group equivalents provided by the crosslinker should be in excess of the carboxylic acid group equivalents provided by the EHA/AA or CEA/AA copolymers, or the CEA/EHA/AA terpolymer respectively. The ratio of carboxylic acid group equivalents in the copolymer or terpolymer to the epoxy group equivalents in the crosslinking agent is known as the "R value", and is defined in Equation 1 as follows:

$$R_{value} = \frac{\text{equivalents of carboxylic acid groups in the copolymer or terpolymer}}{\text{equivalents of epoxy groups in the crosslinking agent}}$$

(Equation 1)

The R value must be adjusted to account for homopolymerization of the epoxy groups while still reacting all of the carboxylic acid groups. R values in accordance with the present invention can vary from about 0.5 to 0.9 but are dependent on the acid strength of the respective copolymer or terpolymer, and the amount of catalyst added, as both can promote homopolymerization of the epoxy component of the crosslinking agent requiring more crosslinking agent in order to have sufficient crosslinking agent in the polyurethane primer composition to react all of the carboxylic acid groups. It is particularly preferred to maintain R values of about 0.6 to 0.8, to assure that all the carboxylic acid groups are reacted.

Failure to react all of the carboxylic acid groups provided by the respective copolymer or terpolymer will result in longer time requirements for curing the polyurethane protective liner after it is applied over the polyurethane primer, particularly at the polyurethane protective liner/primer interface, where unreacted carboxylic acid groups in the polyurethane primer will reduce the reactivity of the polyurethane protective liner's reactive components. This can result in the polyurethane protective liner curing slowly on the surface adjacent the polyurethane primer, but curing rapidly on the surface opposite the surface adjacent the polyurethane primer (hereinafter the "outer surface"). If the outer surface of the polyurethane protective liner cures faster than the rest of the polyurethane protective liner, surface wrinkling and streaking of the polyurethane protective liner may result. Where polyurethane protective liner coating compositions having relatively low viscosity, i.e. 500 centipoise, are used, this effect tends to be more pronounced; high viscosity combined with lower cure temperatures will tend to ameliorate the undesirable effects. Failure to react all of the carboxylic acid groups in the polyurethane primer will also result in reduced crosslink density (because all of the carboxylic acid groups are not crosslinked) and reduced solvent resistance in the polyurethane primer because of the reduced crosslink density.

I.E.2. OPTIONAL HIGHER BOILING POINT SOLVENT

A higher boiling point solvent may be added to the polyurethane primer composition to dilute the composition in order to lower the solids content of the primer composition and slow the rate of solvent evaporation, allowing the solvent to remain in the polyurethane primer composition for sufficient time before its eventual evaporation and slightly delay the crosslinking reaction described below, so as to permit the polyurethane primer composition to flow evenly upon its application over the metal oxide coating, thereby forming a uniform film having optimal optical qualities after crosslinking. A preferred higher boiling point solvent is diacetone alcohol. The higher boiling point solvent is added from about 0 to 40 wt % of the polyurethane primer composition. Exceeding about 40 wt % causes solvent to be trapped in the polyurethane primer.

I.E.3. SURFACTANT

A surfactant, which functions as a flow control agent, may be added to the polyurethane primer composition to improve the flow of the polyurethane primer composition. When the polyurethane primer composition is applied over the metal oxide coating, visible distortion may result from individual pockets of primer which are formed by gradients in the surface tension of the primer. The surfactant lowers the surface tension of the primer, allowing the primer to flow together to form a uniform film on the metal oxide coating. A preferred surfactant is available under the trade name "BYK306" which is available from Byk-Chemie of Germany. The amount of surfactant is preferably at least about 0.05 wt % by weight of the crosslinking solution.

I.E.4. OPTIONAL CATALYST

An optional catalyst is included with the polyurethane primer composition to promote the crosslinking reaction, which can be a Lewis acid catalyst, such as dibutytindilaurate, stannous octoate, or uranyl nitrate. The catalyst may also be of the nucleophilic type such as triphenylphosphine or triethylamine. Weight percents range from 0.1% to 5.0% but preferably 0.5% to 2.0% by weight of polymer and crosslinker present in the primer composition.

I.E.5. BLENDING OF COMPOUNDS IN A SOLVENT TO FORM POLYURETHANE PRIMER COMPOSITION

The EHA/AA copolymer, crosslinking agent, catalyst (if present), surfactant (if present), and higher boiling point solvent (if present) are combined in a solvent to form the polyurethane primer composition. Suitable solvents include alcohols and ketones. A preferred solvent is 1-methoxy-2-propanol, available under the trade name "Dowanol PM" from Dow Chemical of Midland, Mich. The amount of solvent in accordance with the present invention is about 40 to 90 wt % of the polyurethane primer composition, preferably 60 to 70 wt %. About 90 wt % solvent causes poor adhesion of the polyurethane protective liner to the polyurethane primer. Falling below about 40 wt % solvent results in unacceptable optics due to poor flow properties resulting in poor optical properties in the polyurethane primer due to the increased viscosity of the primer composition.

I.E.6. APPLICATION OF THE POLYURETHANE PRIMER COMPOSITION OVER A METAL OXIDE

COATING AND CROSSLINKING TO FORM THE POLYURETHANE PRIMER OF THE INSTANT INVENTION

The polyurethane primer composition is preferably applied over the metal oxide coating by conventional processes including dipping, spraying or flow coating to a thickness of about 0.25 mils to 3 mils. The polyurethane primer composition is air dried at room temperature until the viscosity of the polyurethane primer composition stabilizes. Air drying generally requires ½ to 1 hour. The polyurethane primer composition is then cured, generally at a temperature between about 180° F. to 230° F. (82.2° C. to 110° C.), preferably about. 180° F. (82.2° C.) resulting in crosslinking of the polyurethane primer composition to form the polyurethane primer of the instant invention. Curing will be generally satisfactory after 8 hours, but about 12 hours is recommended to assure complete curing. Persons skilled in the art will alter the cure time inversely with temperature according to the particular circumstances and formulation used.

The polyurethane protective liner is then formulated and applied over the polyurethane primer as follows.

II. THE POLYURETHANE PROTECTIVE LINER

The polyurethane protective liner deposited on the polyurethane primer of the present invention is preferably a transparent layer which is a reaction product of an isocyanate and a polyol such as a diisocyanate reacted with a trifunctional polyol or a triisocyanate reacted with a difunctional polyol.

Preferred isocyanates include aliphatic diisocyanates, aromatic diisocyanates and aromatic triisocyanates.

The polyols can be polycarbonates, polyesters or polyethers or any combination of these polyols combined into a urethane polyol. The polyols typically have number average molecular weights from about 250 to about 6000, preferably from 1000 to 2000. Preferred polyols include polycaprolactone polyol, hexanediol carbonate polyol, cyclohexanedimethanol carbonate polyol, phthalate ester polyol, hexanediol/cyclohexanedimethanol carbonate polyol and mixtures thereof.

The preferred polyurethane protective liner is a crosslinked thermoset polycarbonate polyurethane.

The polyurethane protective liner is applied as an about 80 solids solution over the polyurethane primer that has been applied over the metal oxide coating. The thickness of the cured polyurethane protective liner ranges from 1 mil to 5 mils). The thickness is critical to the protection of the metal oxide coating because the polyurethane protective liner is designed to protect the metal oxide coating and the substrate from abrasion damage, impingement damage and ultraviolet light damage. The thicker the polyurethane protective liner the better the protection of the underlying layers.

Physical properties of the polyurethane protective liner of the instant invention include a molecular weight per crosslink of about 500 to 10,000 grams per mole, where 1000 to 6000 grams per mole is preferred, and more preferred still is a molecular weight per crosslink of about 1909 grams per mole. The polyurethane protective liner has a molecular weight between branch points of about 1279 grams per mole. The urethane content of the polyurethane protective liner can range between 5 to 30%, with a preferred range of about 8 to 22% and a still more preferred urethane content of about 9.4%. The crosslink density and urethane content determine in part the mechanical properties and weatherability of the polyurethane protective liner of the present invention.

To the polyurethane protective liner composition may be added additional compounds, including but not limited to ultraviolet light absorbers, antioxidants, and/or hindered amine light stabilizers.

Polyurethane compositions and reactants are described in detail in the above cited references, particularly U.S. Pat. Nos. 4,335,187 and 4,435,450; see also U.S. Pat. No. 4,434,284. The disclosures of these patents are incorporated herein by reference.

III. THE ELECTROCONDUCTIVE METAL OXIDE COATING

The electroconductive metal oxide coating, may be provided by any conventional known technique on a variety of substrates. Preferred techniques, particularly for plastic substrates, include magnetron sputtering vacuum deposition (hereinafter "MSVD") and/or the cathode sputtering methods of Gillery disclosed in U.S. Pat. No. 4,094,763, which is incorporated herein by reference in its entirety. See also U.S. Pat. Nos. 4,113,599; 4,610,771; 4,622,120 and 5,178,966 for additional procedures which may be used to apply metal oxide, particularly indium/tin oxide coatings or similar electroconductive coatings on a rigid plastic substrate.

While the polyurethane primer of the instant invention is not limited to use with any one particular metal oxide coating, a metal oxide coating that has been found to work particularly well with the polyurethane primer of the instant invention is an indium/tin oxide coating, preferably having at least 3 ohms/sq. resistance and a thickness of less than about 13,000Å. Preferred metal oxide coatings compatible with the polyurethane primer of the instant invention have a resistance of about 3 to 40,000 ohms/sq. and a thickness about 1400 to 13,000Å. A particularly preferred metal oxide coating has a resistance of about 10 ohms/sq. and a thickness of about 7500Å to maintain the metal oxide coating on the substrate through temperature ranges of about −65° F. to +230° F. (−53:9° C. to 110° C.).

The following examples are used to illustrate the present invention; however, as can be appreciated, the invention is not limited thereto.

EXAMPLE 1

In this example, an EHA/AA copolymer was formed (but not crosslinked) as follows. 836.6 grams of EHA and 163.4 grams of AA were added to a 4 liter vessel along with 1000 grams of "Dowanol PM" (1-methoxy-2-propanol) solvent and stirred. 1 gram of azobisisobutyronitrile (AIBN) free radical initiator was added and mixed until all components were dissolved.

The vessel was placed in a 149° F. (65° C.) water bath. Nitrogen was applied above the vessel to prevent oxygen inhibition of the free radical polymerization of the monomers in the vessel. When the temperature in the vessel reached 149° F. (65° C.) the water bath was turned off and ice was added to cool the bath as necessary to maintain the exothermic reaction below 51.6° F. (125° C). Stirring was continued during the exothermic reaction. When the exotherm was complete, the temperature dropped to 212° F. (100° C.), and the water bath was turned back on to maintain vessel contents about 158° F. (70° C.) to continue polymerization for a total of 12 hours, to obtain high conversion of monomer to polymer. Nitrogen flow was continued during the 12 hour polymerization time. The resultant reaction product is a 50% solids content copolymer of EHA/AA in Dowanol PM.

EXAMPLE 2

The copolymer of Example 1 was blended in a solvent with a crosslinking agent, a higher boiling point solvent and a catalyst to form a polyurethane primer composition as follows. To 500 grams of the EHA/AA copolymer of Example 1 was added 114.6 grams Dowanol PM solvent, 156.28 grams diacetone alcohol higher boiling point solvent and 1.74 grams BYK 306 surfactant. The components were mixed thoroughly with an overhead stirrer. 97.25 grams of crosslinking agent ERL4221 was added and the solution was again stirred until the components were completely dissolved, to form a polyurethane primer composition. No catalyst was added. The R value was calculated to be 0.8.

EXAMPLE 3

The polyurethane primer composition of Example 2 was applied over a metal oxide coating and cured to form a polyurethane primer as follows. The polyurethane primer composition of Example 2 was deposited on an indium/tin metal oxide coating which had been in turn deposited on a metal oxide primer which had in turn been deposited on a bisphenol-A polycarbonate substrate measuring about 6 foot in length by 4 foot in width by ½ inch in thickness (1.8 m×1.2 m×1.25 cm) as disclosed in copending U.S. application Ser. No. 08/743,867, filed even date in the name of Thomas G. Rukavina and Robert M. Hunia for an "Improved Aircraft Transparency". The polyurethane primer composition was deposited by flow coating to a thickness of about 2 mils, air dried for 30 minutes to 1 hour and cured at 179.6° F. (82° C.) for about 8 hours to crosslink the polyurethane primer composition and to form a polyurethane primer over the indium/tin metal oxide coating.

The polyurethane primer was a tough and rubbery polymer that had good adhesion to the indium/tin oxide surface. The polyurethane primer was tested by exposure to a Cleveland Condensing Cabinet Humidity Test and/or by scribe tape testing.

The Cleveland Condensing Cabinet Humidity Test includes supporting samples on a rack type system within a closed Cleveland Condensing Cabinet manufactured by Q-Panel Corporation of Cleveland, Ohio, wherein the humidity, temperature and time of exposure to the aforesaid humidity and temperature can be controlled. Scribe tape testing includes cutting a coating on a substrate into squares by scribing with a razor knife, followed by pressing a suitable adhesive tape against the coating and pulling the adhesive tape at approximately a 90° angle to the surface of the coating in an effort to delaminate the coating from the substrate. The scribe tape test is described in ASTM D3359-93, hereby incorporated by reference herein.

A scribe tape test was performed on the polyurethane primer as described in ASTM D3359-93. No polyurethane primer adhesion failure was observed. After exposing the coated composite to a 3-day 140° F. (60° C.) 100% humidity Cleveland Condensing Cabinet Humidity Test, visual inspection of the polyurethane primer determined that no water pockets were seen at the polyurethane primer/indium-tin oxide coating interface. Water pockets, similar in appearance to blisters will form at the metal oxide coating/polyurethane primer interface in the presence of poor adhesion between the metal oxide coating and the polyurethane primer, allowing water to enter the interface and displace the metal oxide coating/polyurethane primer bond.

The sample exposed to the 3 day 140° F. (60° C.) 100% humidity Cleveland Condensing Cabinet Humidity Test was dried for 2 hours at room temperature pursuant to ASTM D3359-93, and the coated composite was again scribe tape tested for adhesion. 100% of the tape test area retained adhesion demonstrating excellent adhesion of the polyurethane primer to the metal oxide coating.

EXAMPLE 4

A polyurethane protective liner was formed and applied over the polyurethane primer of Example 3 (thereby forming a bisphenol-A polycarbonate substrate/metal oxide primer/metal oxide coating/polyurethane primer/polyurethane protective liner composite), as follows.

First a polyurethane protective liner composition was formed by adding solvent, catalyst, temporary catalyst poison, antioxidant, hindered light amine, ultraviolet stabilizer, polyol and isocyanate as follows: 881.4 grams of cyclohexanone solvent was poured into a one gallon vessel. 36.7 grams of a 1% solution of dibutyltindilaurate in cyclohexanone was added to function as a catalyst. 36.7 grams of acetyl acetone was also added to function as a "temporary catalyst poison" to extend the pot life of the composition in the vessel. The acetyl acetone acted as a temporary catalyst poison by reducing the catalytic activity of the dibutyltindilaurate in the vessel, but evaporated off with the solvent after application of the polyurethane protective liner composition over the polyurethane primer as described below, permitting the dibutyltindilaurate to resume normal catalytic reactivity. 18.4 grams of an antioxidant available from Ciba Geigy Inc., of Ardsley, N.Y., under the trade name Irganox 1076 was added to the vessel. 36.7 grams of a hindered amine light available from Ciba Geigy under the trade name Tinuvin 440 was added to the vessel. 55.0 grams of an ultraviolet light stabilizer available from Sandoz, Inc., of Charlotte, N.C., under the trade name Sandoz 3206 was added to the vessel. The mixture was stirred until complete solution was obtained.

The polyol was added in two parts. First, 1500 grams of carbonate diol polyol available from Stahl, Inc. of Boston, Mass., under the trade name KM-10-1667 was melted at about 176° F. (80° C.) and was added in its melted state to the vessel and mixed until a clear solution was obtained. Next, 1000 grams of carbonate diol polyol available from Stahl, Inc. of Boston, Mass., under the trade name KM-10-1733 was melted at about 176° F. (80° C.) and was added in its melted state to the vessel and mixed until a clear solution was obtained. The KM10-1667 functioned to strengthen the polyurethane protective liner, and the KM-10-1733 functioned to slightly soften the polyurethane protective liner.

The above mixture was cooled to room temperature and 1172.35 grams of an isocyanate, specifically a triisocyanate available from Bayer Inc., of Pittsburgh, Pa. under the trade name Desmodur 3390 was added to the vessel and mixed until a clear solution was obtained having a viscosity at about 77° F. (25° C.) of about 1200 centipoise, to form a polyurethane protective liner composition. The equivalent weights of the polyols and isocyanate reactive components in the polyurethane protective liner composition are as set forth in Table 1 below:

TABLE 1

| Component | Equivalent Weight |
|---|---|
| KM-10-1733 | 443.86 grams/equivalent |
| KM-10-1667 | 474.38 grams/equivalent |
| Desmodur 3390 | 216.5 grams/equivalent |

The polyurethane protective liner composition was allowed to react for about 2 hours until the viscosity reached about 1500 centipoise at room temperature.

The polyurethane protective liner composition was applied over the polyurethane primer of Example 3. The polyurethane protective liner composition was applied by flow coating to a thickness of about 4 mils.

The polyurethane protective liner was allowed to air dry until tack free, which was approximately 4 hours. The substrate coated as described, hereinafter "the article" was then placed in an air circulating oven and cured at 180° F (82.2° C.) for approximately 4 hours to form a polyurethane protective liner over the polyurethane primer.

A sample approximately 4"×4" (10.16 cm×10.16 cm) of the article was cut, and abrasion resistance was measured on a Taber Abraser. The Taber Abraser is a device known in the art in which a turntable rotates beneath an abrasive pad attached to a mechanical arm. A sample is placed in the turntable and the table is caused to rotate causing the abrasive pad to abrade the sample. One revolution of the turntable is one cycle. The measurement revealed an increase in haze after 1000 cycles of abrasion of about 7%. Haze was measured by a Haze Gard, Model XL211, manufactured by Pacific Scientific of Newport Beach, Calif.

An additional sample of the article was subjected to scribe tape test according to ASTM D3359-93. No coating failure was observed.

A sample of the article was subjected to a 140° F. (60° C.) 100% humidity Cleveland Condensing Cabinet Humidity Test for about 6 months. Visual inspection once a week for the 6 month period for water pockets at the polyurethane primer/metal oxide coating interface showed none.

A sample of the article subjected to the 6 month 140° F. (60° C.) 100% humidity Cleveland Condensing Cabinet Humidity Test was dried for about 2 hours at room temperature, and the scribe tape test for a dhesion was again performed pursuant to ASTM D3359-93. 80% of the tape test area retained ad hesion demonstrating the excellent adhesion of the polyurethane protective liner to the polyurethane primer, and excellent adhesion of the polyurethane primer to the metal oxide coating.

Comparative Example 1

The same polyurethane protective liner described in Example 4 was applied to an article as described in Example 4, except that the article of this comparative example did not include a polyurethane primer, and therefore, the polyurethane protective liner was applied directly over the metal oxide coating.

A sample of the article of Comparative Example 1 was subjected to the scribe tape test according to ASTM D3359-93,which resulted in 100% removal of the polyurethane protective liner from the scribed area demonstrating the poor adhesion of the polyurethane protective liner to the metal oxide coating.

Another sample of the article of Comparative Example 1 was subjected to a 140° F. (60° C.) 100% humidity Cleveland Condensing Cabinet Humidity Test for 24 hours. Upon visual inspection after testing, many undesirable water pockets were visible at the polyurethane protective liner/ metal oxide coating interface indicating poor polyurethane protective liner adhesion to the metal oxide coating in the absence of the polyurethane primer of the instant invention.

The sample subjected to the 24 hours 140° F. (60° C.) 100% humidity Cleveland Condensing Cabinet Humidity Test was dried for two hours at room temperature, and the article was again subjected to the scribe tape test for adhesion as described in ASTM D3359-93. The test results showed 100% adhesion loss demonstrating the efficacy of the polyurethane primer.

Another sample of the article of Comparative Example 1 was tested on the Taber Abraser for abrasion resistance.

After 100 cycles, the test was stopped as the polyurethane protective liner was completely removed from the metal oxide coating, demonstrating the poor adhesion of the polyurethane protective liner to the metal oxide coating in the absence of the primer of the instant invention.

The above examples are offered to illustrate the present invention and are not intended to limit the invention thereto. Various modifications are included within the scope of the invention, which is defined by the following claims.

We claim:

1. A method of adhering a polyurethane protective liner to a metal oxide coating comprising the steps of:

providing a metal oxide coating;

applying a primer composition comprising a reaction product of a crosslinking agent and a polymer selected from the group consisting of a copolymer of 2-ethylhexylacrylate and acrylic acid, a copolymer of cyanoethylacrylate and acrylic acid and a terpolymer of cyanoethylacrylate, 2-ethylhexylacrylate and acrylic acid in a solvent onto a surface of said metal oxide coating;

drying said primer composition until the viscosity of said primer composition stabilizes;

curing said primer composition to promote crosslinking to form a crosslinked primer on the metal oxide coating; and depositing a polyurethane protective liner coating composition on said crosslinked primer and drying and curing said polyurethane protective liner coating composition to form a polyurethane protective liner over said crosslinked primer;

wherein said polyurethane protective line is adhered to said metal oxide coating by said crosslinked primer.

2. The method of claim 1 wherein the mole ratio of 2-ethylhexylacrylate to acrylic acid in said copolymer of 2-ethylhexylacrylate and acrylic acid is 3:1 to 1:3.

3. The method of claim 1 wherein the mole ratio of cyanoethylacrylate to acrylic acid in said copolymer of cyanoethylacrylate and acrylic acid is 3:1 to 1:3.

4. A method of adhering a polyurethane protective liner to a metal oxide coating comprising the steps of:

providing a metal oxide coating;

applying a primer composition comprising a reaction product of a crosslinking agent and a polymer selected from the group consisting of a copolymer of 2-ethylhexylacrylate and acrylic acid, a copolymer of cyanoethylacrylate and acrylic acid and a terpolymer of cvanoethylacrylate, 2-ethylhexylacrylate and acrylic acid in a solvent onto a surface of said metal oxide coating by a process selected from the group consisting of dipping, spraying and flow coating to a thickness of about 0.25 to 3 mils:

air drying said primer composition at about room temperature for about ½ to 1 hour until the viscosity of said primer composition stabilizes;

curing said primer composition at a temperature of about 180° F. to 230° F. (82.2° C. to 1° C.) for about 8 to 12 hours to promote crosslinking to form a crosslinked primer on the metal oxide coating; and depositing a polyurethane protective coating composition on said crosslinked primer and drying and curing said polyurethane protective liner coating composition to form a polyurethane protective liner over said crosslinked primer;

wherein said polyurethane protective liner is adhered to said metal oxide coating by said crosslinked primer and wherein the mole ratio of cyanoethylacrylate to 2-ethylhexylacrylate to acrylic acid in said terpolymer is 1:2:1 to 0.5:0.5:3.

5. The method of claim 1 wherein said crosslinked primer is about 0.25 to 3 mils thick.

6. The method of claim 1 wherein said polyurethane protective liner is the reaction product of an isocyanate and a polyol.

7. The method of claim 6 wherein said isocyanate is selected from the group consisting of aliphatic diisocyanates, aromatic diisocyanates and aromatic triisocyanates.

8. The method of claim 6 wherein said polyol is selected from the group consisting of polycaprolactone polyol, hexanediol carbonate polyol, cyclohexanedimethanol carbonate polyol, phthalate ester polyol, hexanediol/cyclohexanedimethanol carbamate polyol and mixtures thereof.

9. The method of claim 8 wherein said polyurethane protective liner is about 1 mil to 5 mils thick.

10. The method of claim 8 wherein said polyurethane protective liner is a crosslinked thermoset polycarbonate polyurethane.

11. The method of claim 10 wherein said polyurethane protective liner has a molecular weight per crosslink of about 500 to 10,000 grams per mole.

12. The method of claim 11 wherein said polyurethane protective liner has a molecular weight between branch points of about 1279 grams per mole.

13. The method of claim 12 wherein said polyurethane protective liner has a urethane content of about 5 to 30%.

14. The method of claim 1 further comprising the steps of adding to said polyurethane protective liner a member selected from the group consisting of antioxidants, ultraviolet light absorbers and hindered amine light stabilizers.

15. The method of claim 1 wherein said metal oxide coating is selected from the group consisting of indium oxide, tin oxide and mixtures thereof.

16. The method of claim 1 wherein said primer composition is applied onto said surface of said metal oxide in said applying step by a process selected from the group consisting of dipping, spraying and flow coating.

17. The method of claim 1 wherein said drying step is practiced for about ½ to 1 hour.

18. The method of claim 17 wherein said drying step is practiced in air.

19. The method of claim 18 wherein said drying step is practiced at about room temperature.

20. The method of claim 1 wherein said curing step is practiced for about 8 to 12 hours.

21. The method of claim 1 wherein said crosslinked primer has an R value of between 0.5 and 0.9, wherein the R value is defined as:

$$R_{value} = \frac{\text{equivalents of carboxylic acid groups in the copolymer or terpolymer}}{\text{equivalents of epoxy groups in the crosslinking agent}}$$

22. The method of claim 1 wherein said crosslinking agent is a cycloaliphatic crosslinking agent.

23. The method of claim 22 wherein said crosslinking agent includes cycloaliphatic diepoxides.

24. The method of claim 23 wherein said crosslinking agent is selected from the group of compounds of the general formula:

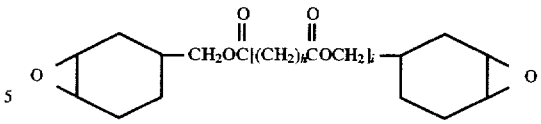

where h is an integer from 0 or 1 and i is an integer from 2 to 6.

25. The method of claim 22 wherein said crosslinking agent is selected from the group consisting of 3,4-epoxycyclohexylmethyl-3,4-epoxycyclohexanecarboxylate and bis (3,4-epoxycyclohexyl)adipate.

26. The method of claim 1 wherein said primer has a glass transition temperature below a temperature that produces thermal stress in said metal oxide layer.

27. The method of claim 26 wherein said primer has a glass transition temperature after crosslinking of less than 180° F. (82.2° C).

28. The method of claim 27 wherein said polymer includes a copolymer of 2-ethylhexylacrylate and acrylic acid having a glass transition temperature after crosslinking of about 131° F. (55° C.).

29. The method of claim 1 further comprising the step of forming the primer composition as a monomer/solvent solution wherein said monomers are selected from the group consisting of monomers of 2-ethyhexylacrylate, acrylic acid, cyanoethylacrylate and mixtures thereof, wherein said monomers are dissolved in a solvent to form a monomer/solvent solution wherein the solvent is selected from the group consisting of alcohols and ketones and the monomers comprise 10 to 80 weight percent of the monomer/solvent solution.

30. The method of claim 29 wherein said solvent is 1-methoxy-2-propanol.

31. The method of claim 28 wherein the monomers comprise 40 to 60 weight percent of the monomer/solvent solution.

32. The method of claim 29 further comprising the step of adding a free radical initiator to the monomer/solvent solution to initiate polymerization of said monomers.

33. The method of claim 32 wherein the free radical initiator is within the range of about 0.10 to about 1.0 weight percent by weight of the monomers present in the monomer/solvent solution.

34. The method of claim 32 wherein the free radical initiator is azobisisobutyronitrile.

35. The method of claim 29 further comprising the step of adding a higher boiling point solvent to said monomer/solvent solution in an amount of up to 40 weight percent of said primer composition.

36. The method of claim 35 wherein said higher boiling point solvent is diacetone alcohol.

37. The method of claim 1 further comprising the step of adding a surfactant to the primer composition to improve the flow of the primer composition.

38. The method of claim 1 further comprising the step of adding a catalyst to the primer composition to promote the crosslinking reaction of said crosslinking agent in said primer composition.

39. The method of claim 38 wherein said catalyst is selected from the group consisting of a Lewis acid catalyst and a nucleophilic catalyst.

40. The method of claim 39 wherein said catalyst is selected from the group consisting of dibutyltindilaurate, stannous octoate, uranyl nitrate, triphenylphosphine and triethylamine.

* * * * *